United States Patent Office 2,941,001
Patented June 14, 1960

2,941,001
MANUFACTURE OF AMINOPHOSPHINES

Anton B. Burg and Peter J. Slota, Jr., Los Angeles, Calif., assignors, by mesne assignments, to American Potash & Chemical Corporation, a corporation of Delaware No Drawing. Filed June 25, 1956, Ser. No. 593,365

7 Claims. (Cl. 260—551)

This invention relates to the manufacture of aminophosphines and their utilization to provide various polymeric phosphinoborines.

We have found that aminophosphines having the general formula

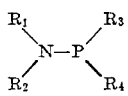

where $R_1$, $R_2$, $R_3$ and $R_4$ are hydrocarbon radicals or substitution derivatives thereof, can be reacted with a boron hydride under suitable conditions to give a polymeric phosphinoborine having high thermal stability and which is useful for various purposes, e.g., thermally stable elastomers, plastics, adhesives, hydraulic fluids, lubricants and petroleum additives.

It is to be understood that such results are possible whenever the P—N bond is present, with any of a large variety of groups on N or P playing only the secondary role of completing the valence of N or P, or permitting further reactions to occur either concomitantly with or after the main attack upon the N—P function. For example, $R_1$, $R_2$, $R_3$, or $R_4$ might be any one of various alkyl groups.

While any boron hydride can be utilized, the character and degree of polymerization depends upon the particular boron hydride employed. For example, using diborane, $B_2H_6$, we obtained trimeric dialkylphosphinoborines or trimeric diarylphosphinoborines in proportions approaching half of the original phosphorus content. Pentaborane-9 yields higher polymers wherein the nitrogen and phosphorus bridging of a condensed boron hydride structure results in a valuable degree of thermal stability; in either case, the products formed have value. One can also use tetraborane, pentaborane and decaborane as the boron hydride.

To form an aminophosphine, phosphorus trichloride is dissolved in diethyl ether and slowly treated with an amine such as dimethylamine, yielding the mono-aminodichlorophosphine and amine hydrochloride in accordance with Michaelis, Ann. 326, 129 (1903). After filtration to remove the amine hydrochloride, the solution is very slowly treated with an ether solution of a Grignard reagent, such as $CH_3MgBr$, in a container at $-78°$ C., with good stirring, and under a dry inert atmosphere such as nitrogen. Following the addition of the Grignard reagent, the mixture is allowed to warm slowly to the reflux temperature, which it is maintained for at least forty minutes. The aminophosphine can then be isolated with a fractionating column.

The invention will become further apparent from the following illustrative examples.

*Example 1.*—A 130-gram sample of dimethylamine (2.9 moles) was permitted to bubble into a one-liter solution of 275 grams (2.0 moles) of phosphorus trichloride in diethyl ether, contained in a three-neck Pyrex flask equipped with a mechanical stirrer, a solid carbon dioxide cold-finger, and an inlet for dry nitrogen. The vigorous reaction was moderated by surrounding the lower part of the flask by ice-cooled water. The resulting solution was filtered from the mass of solid amine hydrochloride, and the desired dimethylaminodichlorophosphine, $(CH_3)_2NPCl_2$, was isolated by fractional distillation. A 70-gram portion of the product was then dissolved in 650 ml. of diethyl ether, cooled to $-78°$ C. in a three-neck reaction flask having the stirrer, coldfinger, and nitrogen inlet, as before, and treated very slowly with a Grignard reagent made from 103 g. of methyl bromide and 26 g. of magnesium in diethyl ether. At various points in the process, the system had to be warmed to permit the stirrer to operate; then it was recooled and the addition of Grignard reagent continued. Upon completion of the reagent addition, the system was allowed to warm to room temperature and stirred until the tacky, dark-gray solid had lost its dark color and tacky character; this required 60 minutes at room temperature and 90 minutes at a reflux temperature. Twelve hours later, the solution was poured off and combined with ether-washings from the solid; and the desired aminophosphine was isolated by means of a small helix-packed fractionating column. The yield was 25 grams, or 47.6%, based upon $(CH_3)_2NPCl_2$.

To employ an aminophosphine for making phosphinoborine polymers, one mole of diborane is allowed to be absorbed into one mole of the aminophosphine at a low temperature, and the product is slowly heated in a closed chamber from which hydrogen can be led off. Volatile products such as the aminoboron hydrides are observed and, finally, at temperatures above 150° C., the trimer of a dialkylphosphinoborine can be sublimed off in vacuo. A polymeric residue having high thermal stability and a considerable excess of boron and hydrogen atoms over phosphorus and nitrogen, remains as a byproduct. The yields of the trimer usually exceed 40% based upon the phosphorus compound.

Alternatively, the compound pentaborane-9 $(B_5H_9)$ can be allowed to absorb twice as many moles of aminophosphine, and upon slow heating in a closed system, from which volatile products can be removed under control, yields small proportions of trimeric phosphinoborine and large proportions of aminoboron hydrides and a material, yellow in color, and having a glue-like consistency at 400° C., at which temperature it appears to be stable. At room temperature, this product is a light-yellow glass, resistant to the action of water, non-oxidizing acids, and organic solvents, but, dissolved slowly by nitric acid. The physical properties of such materials can be varied by a choice of various different hydrocarbon groups on phosphorus and nitrogen, and by choosing different boron hydrides or derivatives thereof.

In the preparations discussed below, the same apparatus was employed as described in Example 1. The reactions were carried out under an atmosphere of dry nitrogen. During addition of the Grignard reagents, the reaction mixtures were kept at the lowest possible temperature that would still permit the stirrer to operate effectively.

*Example 2.*—A solution of the Grignard reagent prepared from 98 g. of ethyl bromide and 24 g. of magnesium was slowly added to a $-78°$ C. cooled ether solution containing 69.6 g. of diethylaminodichlorophosphine. After reaction was complete, the solution was removed and combined with ether-washings of the solid. Fractional distillation produced 22 g. or a 41% yield of P-diethylaminodiethylphosphine $(C_2H_5)_2NP(C_2H_5)_2$, based upon $(C_2H_5)_2NPCl_2$.

The aminophosphines cited in the above examples were brought into reaction with diborane producing aminoboron hydrides and the phosphinoborine trimer corresponding to the aminophosphine employed. Polymeric residues varying in thermal stability and hardness were obtained as by-products.

Reaction of the aminophosphines with $B_5H_9$ yielded small amounts of trimeric phosphinoborines, large portions of aminoboron hydrides, and polymeric material whose physical properties varied as to what groups are situated on phosphorus and nitrogen.

We claim:

1. As a new composition of matter: dimethylaminodimethylphosphine.

2. As a new composition of matter: diethylaminodiethylphosphine.

3. A process comprising: contacting a monoaminodichlorophosphine of the general formula $RR'NPCl_2$ wherein said R and R' are lower alkyl with a Grignard reagent of the type $R''MgX$ wherein X is a halogen and wherein R'' is an alkyl radical in an ethereal solution at a temperature of about $-78°$ C.; and thereafter warming the mixture so formed whereby to form an aminophosphine of the formula $RR'NPR''_2$.

4. The process of claim 3 wherein the monoaminodichlorophosphine is dimethylaminodichlorophosphine and wherein the Grignard reagent is methyl magnesium bromide.

5. The process of claim 3 wherein the monoaminodichlorophosphine is diethylaminodichlorophosphine and wherein the Grignard reagent is ethyl magnesium bromide.

6. A process comprising: contacting a monoaminodichlorophosphine of the general formula $RR'NPCl_2$ wherein said R and R' are lower alkyl with a Grignard reagent of the type $R''MgX$ wherein X is a halogen and wherein R'' is an alkyl radical in an ethereal solution and in the presence of an inert atmosphere at about $-78°$ C.; and thereafter warming the mixture so formed whereby to form an aminophosphine of the general formula $$RR'NPR''_2.$$

7. The process of claim 6 wherein the mixture so formed is warmed to reflux.

References Cited in the file of this patent

UNITED STATES PATENTS

| | | |
|---|---|---|
| 1,990,609 | Meis | Feb. 12, 1935 |
| 2,146,584 | Lipkin | Feb. 7, 1939 |

OTHER REFERENCES

Kosolapoff: Organophosphorus Compounds, John Wiley, New York, pp 5; 16; 17 (1950).